US009248742B2

(12) United States Patent
Wimmer et al.

(10) Patent No.: US 9,248,742 B2
(45) Date of Patent: Feb. 2, 2016

(54) MOTOR VEHICLE COMPRISING A DRIVER ASSISTANCE DEVICE AND METHOD FOR OPERATING A MOTOR VEHICLE

(71) Applicant: AUDI AG, Ingolstadt (DE)

(72) Inventors: Martin Wimmer, Regensburg (DE); Karl-Heinz Siedersberger, Ingolstadt (DE); Heike Sacher, Munich (DE); Franziska Ehrhart, Ingolstadt (DE); Fabian Scheiffert, Weinstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/377,132

(22) PCT Filed: Feb. 1, 2013

(86) PCT No.: PCT/EP2013/000302
§ 371 (c)(1),
(2) Date: Aug. 6, 2014

(87) PCT Pub. No.: WO2013/117309
PCT Pub. Date: Aug. 15, 2013

(65) Prior Publication Data
US 2015/0032321 A1   Jan. 29, 2015

(30) Foreign Application Priority Data
Feb. 6, 2012  (DE) .......................... 10 2012 002 305

(51) Int. Cl.
*B60K 37/06*   (2006.01)
*G05G 1/00*   (2008.04)
(Continued)

(52) U.S. Cl.
CPC ................ *B60K 37/06* (2013.01); *B60W 50/08* (2013.01); *B60W 50/082* (2013.01);
(Continued)

(58) Field of Classification Search
CPC ....... E02F 9/2004; B60K 23/00; B60K 37/06; B60K 2350/102; B60K 2350/00; B60K 2350/082; B60K 2350/1048; B60T 7/04; B60N 2/4693; F16H 59/00; F16H 61/32; F16H 59/0204; F16H 59/105; F16H 59/10; F16H 59/044; G05G 9/047; G05G 1/00; G05G 1/58

See application file for complete search history.

(56) References Cited

U.S. PATENT DOCUMENTS

| 5,845,735 A | 12/1998 | Mueller et al. |
| 6,446,747 B1 | 9/2002 | Mueller et al. |

(Continued)

FOREIGN PATENT DOCUMENTS

| DE | 41 20 975 A1 | 1/1993 |
| DE | 195 48 717 C1 | 5/1997 |

(Continued)

OTHER PUBLICATIONS

International Search Report mailed May 31, 2013 in corresponding International Patent Application No. PCT/EP2013/000302.

(Continued)

*Primary Examiner* — Jerrah Edwards
*Assistant Examiner* — Aaron Smith
(74) *Attorney, Agent, or Firm* — Staas & Halsey LLP

(57) ABSTRACT

A motor vehicle has a driver assistance device which is designed to guide the motor vehicle independently and can be switched between several assistance modes which differ in a degree of autonomy of the driver assistance device when driving the motor vehicle. An operating device having several operating elements allows the user to adjust respective driving parameters, which determine a driving behavior of the driver assistance device, in at least one of the assistance modes as a function of an activation of the operating elements. The operating device is designed in the form of a palm rest. Some of the operating elements are arranged on a support body. The support body is mounted such that it can be manually rotated about a vertical axis, and the driver assistance device is designed to adjust the currently active assistance mode as a function of a rotary position of the support body.

17 Claims, 6 Drawing Sheets

(51) Int. Cl.
*G05G 1/58* (2008.04)
*B60W 50/08* (2012.01)
*G05G 1/08* (2006.01)
*B60W 50/14* (2012.01)
*G05G 1/10* (2006.01)
*B60W 50/00* (2006.01)

(52) U.S. Cl.
CPC ............ *B60W 50/085* (2013.01); *B60W 50/14* (2013.01); *G05G 1/08* (2013.01); *G05G 1/10* (2013.01); *G05G 1/58* (2013.01); *B60K 2350/102* (2013.01); *B60K 2350/1048* (2013.01); *B60W 2050/0074* (2013.01); *B60W 2540/04* (2013.01)

(56) References Cited

U.S. PATENT DOCUMENTS

| | | | |
|---|---|---|---|
| 7,163,455 B2 * | 1/2007 | Ogawa et al. | 454/69 |
| 8,028,599 B2 * | 10/2011 | Mack | 74/471 XY |
| 8,355,838 B2 * | 1/2013 | Itoh et al. | 701/36 |
| 8,688,306 B1 * | 4/2014 | Nemec et al. | 701/25 |
| 2011/0214525 A1 | 9/2011 | Voss et al. | |

FOREIGN PATENT DOCUMENTS

| | | | | |
|---|---|---|---|---|
| DE | 10 2007 029 594 A1 | | 1/2009 | |
| DE | 102007029594 A1 * | | 1/2009 | ............ F16H 59/12 |
| DE | 60 2005 006 201 T2 | | 7/2009 | |
| DE | 10 2010 053 889 A1 | | 7/2011 | |
| DE | 10 2010 010 095 A1 | | 9/2011 | |
| DE | 10 2010 022 433 A1 | | 12/2011 | |
| DE | 10 2010 032 358 A1 | | 2/2012 | |
| DE | 10 2012 002 305.7 | | 2/2012 | |
| EP | 1 980 441 A1 | | 10/2008 | |
| WO | WO 2008138491 A1 * | | 11/2008 | |
| WO | PCT/EP2013/000302 | | 2/2013 | |

OTHER PUBLICATIONS

German Search Report mailed Oct. 31, 2012 for corresponding German Patent Application No. 10 2012 002 305.7.

* cited by examiner

US 9,248,742 B2

MOTOR VEHICLE COMPRISING A DRIVER ASSISTANCE DEVICE AND METHOD FOR OPERATING A MOTOR VEHICLE

CROSS REFERENCE TO RELATED APPLICATIONS

This application is based on and hereby claims priority to International Application No. PCT/EP2013/000302 filed on Feb. 1, 2013 and German Application No. 10 2012 002 305.7 filed on Feb. 6, 2012, the contents of which are hereby incorporated by reference.

BACKGROUND

The invention relates to a motor vehicle comprising a driver assistance system which is configured to drive the motor vehicle independently during travel of the motor vehicle. The term "driving the motor vehicle" comprises here, on the one hand, the steering of the motor vehicle (consequences of a road profile, orientation of the motor vehicle within a lane, lane-changing maneuver), which is also referred to as lateral guidance, and, on the other hand, the control of the speed of the motor vehicle (accelerating, braking, emergency braking, stopping, maintaining the speed), which is also referred to as longitudinal guidance. The invention also includes a motor vehicle and a method for operating a motor vehicle, which method permits the performance of operator control of the driver assistance system.

A driver assistance system of the specified type is known from DE 10 2010 022 433 A1. According to said document, a driver assistance system can, in a fully automatic assistance mode, drive the vehicle completely independently. The driver of the motor vehicle then neither has to operate the steering wheel nor the pedals of the motor vehicle during travel and can therefore turn his attention to other things, such as, for example, operation of an infotainment system, for a relatively long time.

However, in the context of the invention independent driving of the motor vehicle is also to be understood as meaning a partially automatic assistance mode in which the degree of independence of the driver assistance system is reduced during the driving of the motor vehicle and which can then consist, for example, merely in the functionality of adjusting the speed of the motor vehicle to a set point speed or set speed which the driver predefines by setting a value of the corresponding driving parameter of the driver assistance system (cruise control).

A further desirable assistance mode is the autonomous driving of the motor vehicle by a driver assistance device. In contrast to the fully automatic assistance mode, in the autonomous assistance mode the driver assistance device also decides which values are to be implemented for the driving parameters (set point distances, set point speed) for an currently implemented driving maneuver and/or which driving maneuvers (lane change, turning off the road, parking and the like). In contrast, in the fully automatic assistance mode there is provision that the driver uses a user interface to predefine which driving maneuvers are to be implemented or which distances and speeds are to be set by the driver assistance device during an currently implemented driving maneuver as the vehicle travels along a lane. A further difference between the two assistance modes can consist in how the driver assistance device reacts in the event of an unforeseen development of events on the road, that is to say if safe driving is no longer ensured by the driver assistance device. In the fully automatic assistance mode there is then provision that the driver assistance device is deactivated and transfers control of the motor vehicle to the driver, while, in contrast, in the autonomous assistance mode the driver assistance device itself places the motor vehicle in a safe state, for example by stopping the motor vehicle.

Depending on the currently active assistance mode, certain driving tasks are carried out independently by the motor vehicle, i.e. without involvement of the driver, during travel. However, in this context it must be ensured for each assistance mode in which the driver assistance device can be operated that the driver is always clear as to the degree to which the driver assistance system monitors and drives the motor vehicle, which intervention possibilities are still available to the driver himself during the driving of the motor vehicle and which driving tasks the driver must necessarily carry out himself. If the driver loses an overview here his safety may be compromised. If the driver wrongly believes, for example, that the driver assistance device is in the fully automatic assistance mode and therefore lets go of the steering wheel in order to deal with the Infotainment system, in such a situation the vehicle may run off the road because the driver assistance device is, for example, not activated at all, that is to say a fully manual driving mode is demanded of the driver (this is therefore referred to as the manual assistance mode here).

The range of independence of the driver assistance device (automation range) which extends from manual driving to partial and full automation and then on to autonomy should in its complexity in future be transparent and easily comprehensible to the user in terms of operating it. Important properties of future operator control concepts are easily handled complexity of these four specified assistance modes, clear delineation between the individual assistance modes and characteristic operator control modalities within the individual assistance modes. Whereas operator control elements such as keys, a steering wheel or a lever, which are established for partial automation (for example cruise control, active lane control, i.e. lane keeping assistance), are available, until now there have only been theoretical approaches to the prototypical operator control for full automation and for autonomy. These approaches are frequently merely supplements or extensions of existing operator control concepts and constitute isolated solutions. Such isolated solutions generally do not amount to more than mere functional integration into existing operator control elements, which leads to an increase in the functional density of the individual operator control elements and therefore is not well targeted owing to the large number and complexity of the operator control devices which result here. The handling capabilities and functional variety of current operator control elements has already been fully exploited.

SUMMARY

It is an object of the present invention to ensure a clear overview when performing operator control in a motor vehicle having a driver assistance device which can drive the motor vehicle completely or partially independently.

The object is achieved by means of a motor vehicle as claimed in patent claim 1 and a method as claimed in patent claim 14. Advantageous developments of the motor vehicle according to the invention are provided by means of the dependent claims.

In the motor vehicle according to the invention, the driver assistance device has an operator control device having a plurality of operator control elements. Driving parameters of the driver assistance device which define the driving behavior of the driver assistance device, that is to say for example a set point distance from a vehicle traveling ahead or a set point speed in a partially automatic assistance mode, can be set by means of the operator control elements as a function of the currently active assistance mode. The term operator control element is used quite generally in the context of the invention to mean, for example, an individual key, a switch, a rocker switch, a rotary wheel, a touch pad, a touch screen, a capacitive sensor key or some other switching device by means of which a switched state can be changed by touching a surface provided for that purpose or by pressing such a surface or by moving a finger toward such a surface.

The operator control device is configured as a palm rest and for this purpose has a support body for a hand surface of a user of the operator control device, which support body is arranged in the primary reach of the driver. The primary reach is to be understood here generally as meaning that region of the motor vehicle which the driver can reach with his hand in a relaxed, leant-back posture from the driver's seat, that is to say for example the center console or the driver's door of the motor vehicle. The support body has two particular features. On the one hand, a plurality of the operator control elements of the operator control device are arranged on the support body. On the other hand, the support body is mounted so as to be rotatable about a vertical axis. The driver assistance device is configured here to set the currently active assistance mode as a function of a rotational position of the support body.

The support body can be configured, for example, as a flat knob or as a bar on which the driver can rest his free hand during travel. If the driver then does not wish to take over all the driving himself but instead would like to activate cruise control for example, he can correspondingly rotate the support body, which then activates the partially automatic assistance mode. At the same time, the changed rotational position also causes the relative position of the individual operator control elements, that is to say of keys and the like which are located on the support body, to change with respect to the driver. In other words, only those operator control elements which are required to perform operator control of the assistance mode which has been set are positioned in such a way that they are located near to the fingertips of the hand resting on the support body. The driver can therefore directly reach them without having to fumble around for them and can be sure that he is using the correct keys for the operator control.

The concept of the palm rest therefore forms an integrative approach which integrates the operator control of the automation range, which can range from manual travel to partial automation and full automation and on as far as autonomy, into a single operator control device. The appearance of the support body and the functionality of the individual operator control elements, upon which functionality operator control can be performed, are variable and can be adapted independently of the currently selected assistance mode.

In order to make the change in the relative position of an operator control element with respect to the driver particularly clearly perceptible when the support body rotates, there is expediently provision that this operator control element is arranged on an outer circumference of the support body, wherein this outer circumference is formed in a plane perpendicular to the vertical axis of the motor vehicle. Since the support body is rotatable about its vertical axis, when there is a given change in angle of the rotational position of the support body the greatest positional displacement of the operator control element therefore occurs for such an operator control element arranged on the outer circumference. It is therefore possible for even large operator control elements such as, for example, rocker switches to experience a change in position which is clearly perceptible by the operator.

By means of a rotatable support body it is also possible to achieve the situation that an operator control element which is arranged next to the support body in the primary reach can be operated, or not, as a function of the rotational position of the support body. For this purpose, the support body expediently has at least one wing element which covers this operator control element as a function of the rotational position of the support body. This prevents the operator being induced to operating the operator control element in an assistance mode in which it is without a function.

This embodiment of the support body can be advantageously developed if an operator control element is arranged on at least one wing element itself. The operator control element is arranged here in such a way that in that rotational position of the support body in which the wing element covers the operator control element arranged next to the support body said operator control element is located above precisely this operator control element. As a result, the advantage is obtained that depending on the currently active assistance mode either the key which is located next to the support body or the key which is located on the wing element can be made available in an ergonomically favorable position which is easy for the operator to reach.

In addition to rotatability of the support body it is also possible to provide that the support body is mounted in such a way that it can be lowered in an interior trim of the motor vehicle and moved out of it again. The lowering and the moving out can then be triggered by the user by pressing on the support body. The term 'can be triggered' means here that the support body has to be pressed into the console manually by the user or that an actuator (for example an electric motor) is made available which is activated by pressing a key on the support body and which then moves the support body into the console or moves it out of said console again. In this development with a lowerable support body, the driver assistance device is then configured also to change the currently active assistance mode in each case together with the lowering or the moving out. This provides the advantage that the support body can always be removed from the reach of the user if the driver assistance device is in an assistance mode in which operator control of the operator control elements of the support body is not provided.

The support body is expediently held in the lowered position by means of an actuator or by what is referred to as a push-push locking means. The latter is known, for example, from ballpoint pens in which locking and unlocking can also be brought about by repeatedly pressing a knob (push-push). In the operator control device the knob to be pressed would then be the support body itself.

Another advantageous development is obtained if not only the operator control elements on the support body and next to the support body are configured to perform operator control of the driver assistance device but also the support body itself. For this purpose it can be provided that the support body is configured in such a way that it can be deflected transversely with respect to a vertical axis of the motor vehicle in at least one rotational position by rotational deflection (that is to say for example by tipping about a base point) and/or by translational deflection. In order in this context to provide an operator control possibility for the driver assistance device the latter is then configured to operate the support body as a control lever for performing operator control of the driver assistance device. In other words, the support body can be operated, for example, as a "joystick". The support body can preferably be deflected in a monostable fashion in order to perform operator control of the driver assistance device with the result that said support body moves back automatically again into the home position. This deflection for the operator control is to be distinguished here from rotation about the vertical axis in order to switch over between two assistance modes.

In respect of a support body which is configured to be deflectable it has also proven expedient if the operator control device additionally has an actuator which is configured to set a force/travel characteristic curve at the support body. By predefining a force sink or a restoring force which becomes larger as the deflection increases it is therefore possible to convey to the user of the operator control device, for example, a particularly favorable value for a driving parameter or a risk which increases as the driving parameter is modulated further. In this context the driver does not even have to avert his gaze from the traffic in order to direct it, for example, to a display and thereby be able to detect the risk.

Similarly to a force/travel characteristic curve it can also be expedient to generate a force feedback for the user at the support body. In this context, the support body is then actively deflected in one direction by an actuator of the spring device and in this way, for example, the user's hand is guided when setting a favorable value for a driving parameter. The user can, for example, be warned by means of a vibration. Likewise, parameters from perception of the surroundings (image processing on the basis of a camera or radar system) can be communicated to the user.

The described operator control device with rotatably mounted support body can be used very flexibly. It can be used to perform operator control of a driver assistance device in a large number of different assistance modes. For example, one embodiment of the motor vehicle according to the invention provides that the driver assistance device is configured, in a partially automatic assistance mode, to drive the motor vehicle in a partially automated fashion on the basis of driving parameters which can be set by the user by means of the operator control device, that is to say, for example a set speed or a set point distance from a vehicle traveling ahead in relation to cruise control. The partially automatic assistance mode described here is distinguished here by the fact that maintaining a corresponding mechanical or electro-mechanical coupling makes it possible that a driver of the motor vehicle can also himself always directly drive the motor vehicle by means of a steering handle, that is to say for example a steering wheel, and/or a pedal. The driving of the motor vehicle by the driver and the driving by means of the driver assistance system therefore take place in parallel with one another by virtue of the fact that the individual driving actions are superimposed.

A further expedient assistance mode is the fully automatic assistance mode in which the motor vehicle is driven in a completely automated fashion by independent longitudinal and lateral guidance by the driver assistance device. Via a user interface, a driving maneuver which is to be implemented by the driver assistance device can be selected and/or a driving parameter of a driving maneuver which is currently being carried out can be set. A driving maneuver is to be understood here as meaning, for example, overtaking of a vehicle traveling ahead, a lane change, turning off the road into another road and parking the motor vehicle, that is to say all those driving actions which imply a lane change. In the fully automatic assistance mode, the driver therefore uses the operator control device to predefine only how the motor vehicle is to be driven by the driver assistance device. The driving per se is performed by the driver assistance device after the reception of the predefinition itself. In this context, the steering wheel and the pedal system continue to be available in order to assume control or for a brief intervention. The user interface can be, for example, the one which was filed as a patent by the applicant together with the present application on the same date.

If the decision as to what value is to be set for a driving parameter is additionally also taken by the driver assistance device itself, the autonomous assistance mode in which the driver then no longer has to make any predefinitions via the operator control device is brought about. This autonomous assistance mode is particularly suitable if, for example in a traffic jam, the driver is to be provided with the possibility of reading a newspaper or of dealing with an Infotainment system and in the process of averting his gaze from the events on the road for an indeterminate time.

A particularly preferred embodiment of the motor vehicle according to the invention provides that a user of the operator control device can carry out the following sequence of operator control steps by means of the support body. Firstly, moving the support body out from the interior trim by, for example, a corresponding actuator being activated or a push-push locking means being released by pressing on the support body. Secondly, rotating the support body through a predetermined angle about its vertical axis so that in the process the position of at least some operator control elements which are located on the support body is changed with respect to the driver. Thirdly, as a last operator control step in the sequence there is then provision for the lowering of the support body in the interior trim.

In each of these three operator control steps, the assistance mode in the driver assistance device is also changed. In this case, the driver assistance device is originally in a manual assistance mode which does not provide for driving of the motor vehicle by the driver assistance device at all. By moving the support body out of the interior trim, the partially automatic assistance mode is then activated, which mode provides at least cruise control. By rotating the support body, a changeover from the partially automatic assistance mode into a fully automatic assistance mode is brought about, which fully automatic assistance mode provides independent longitudinal and lateral guidance of the motor vehicle by the driver assistance device. Since the user subsequently lowers the support body into the interior trim again, an autonomous assistance mode, which provides completely independent driving of the motor vehicle, is activated. The described sequence of operator control step permits the user therefore to increase the degree of independent in the driver assistance device during the driving of the motor vehicle incrementally in a clear fashion. At the same time, the lowered position of the support body in the manual and in the autonomic assistance modes conveys clearly to the driver that in these assistance modes he does not have any influence on the driver assistance device via the operator control elements, with the result that unnecessary erroneous operator control is excluded.

The "palm rest" concept according to the invention is also implemented by the method according to the invention for operating a motor vehicle. According to the method, during travel of the motor vehicle a change in the position of the support body is detected by the driver assistance device and an assistance mode of the driver assistance device is set as a function of the detected change. At the same time, at least one functionality which is made available by the driver assistance device in the assistance mode which is then set is assigned to one of the operator control elements of the operator control device, with the result that by activating this operator control element the functionality can be activated. In other words, the individual operator control elements are provided with different functionalities or, if appropriate, also deactivated if they are not required, as a function of the currently active assistance mode.

The invention also includes developments of the method according to the invention which have features which correspond to features of the developments of the motor vehicle according to the invention which have already been described. For this reason, the developments of the method according to the invention are not described again here.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
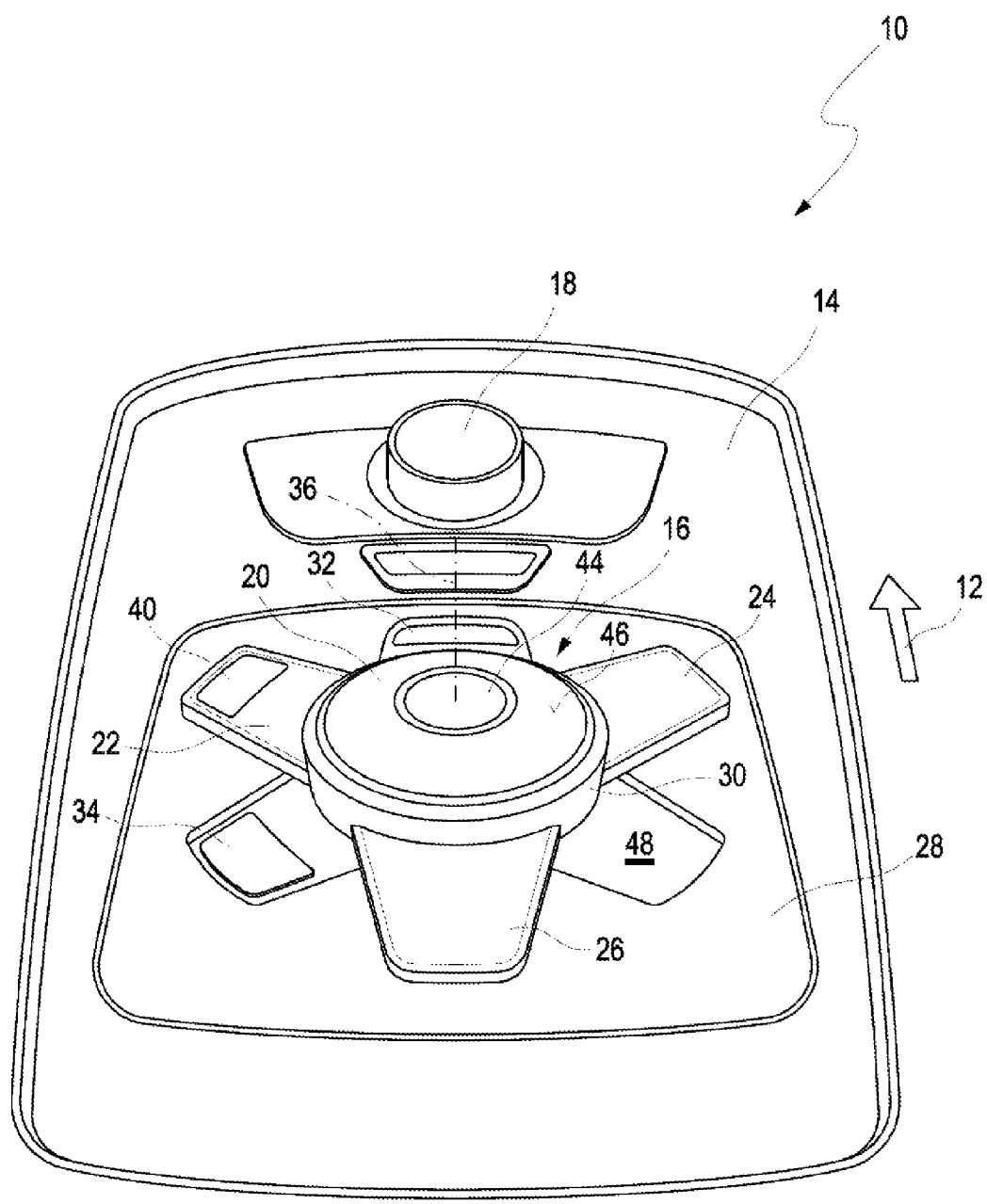
FIG. 1 shows a schematic illustration of a center console of an embodiment of the motor vehicle according to the invention in a perspective view.
Figure 2:
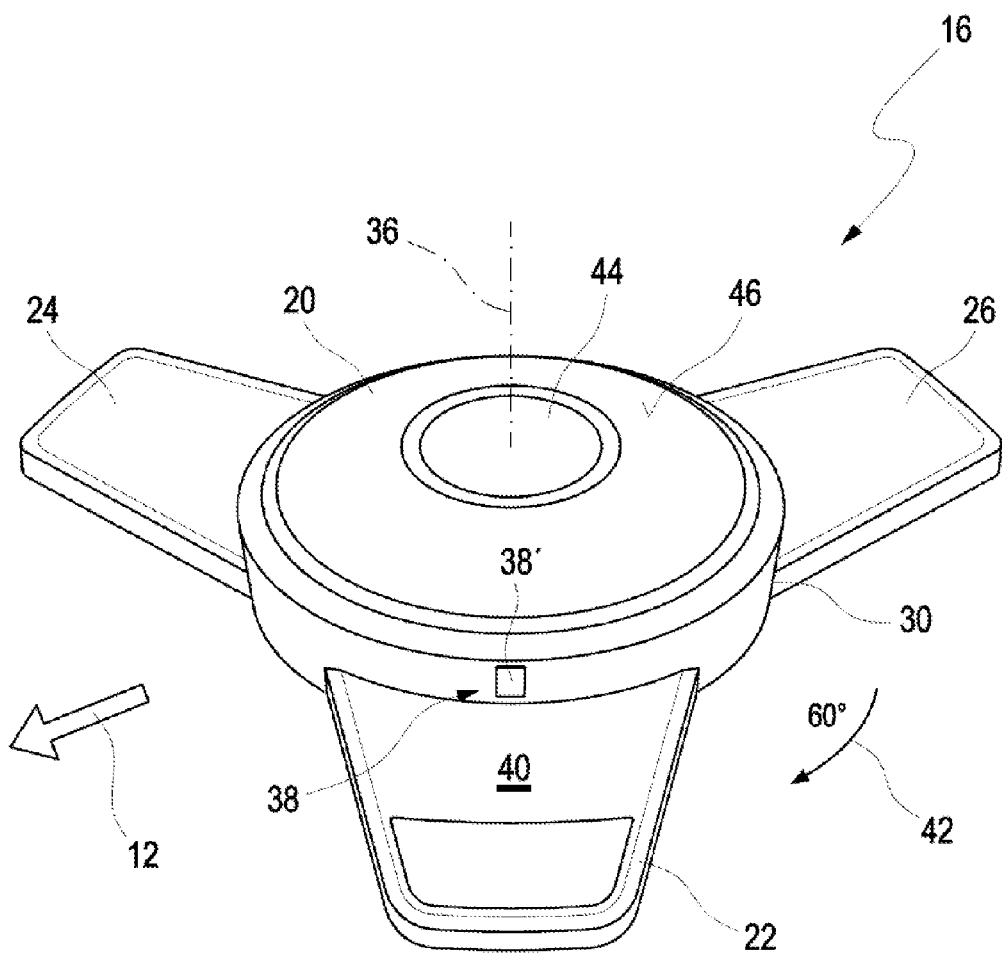
FIG. 2 shows a schematic illustration of a palm rest of the center console of FIG. 1 in a perspective view.
Figure 3:
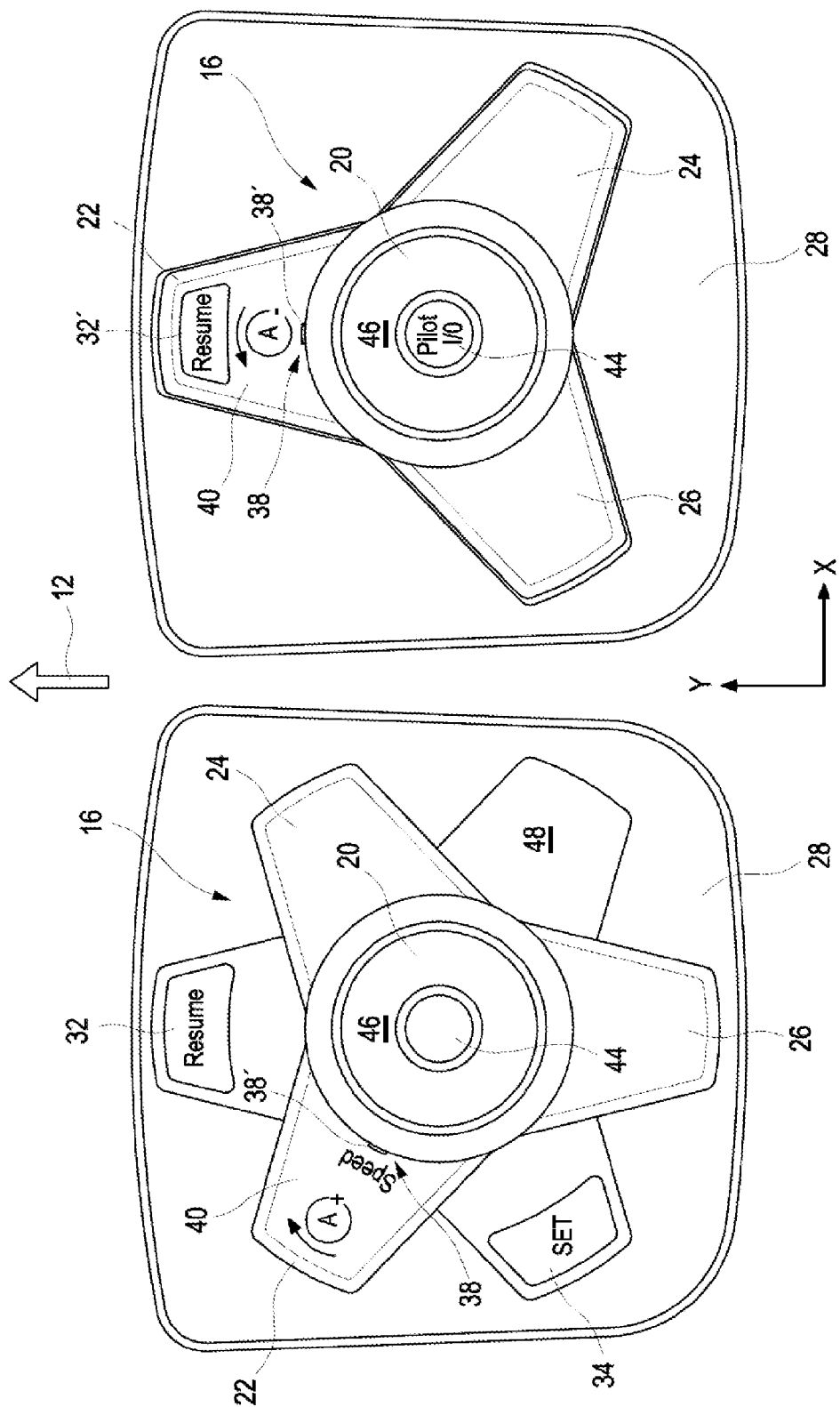
FIG. 3 shows a schematic illustration of a plan view of the palm rest of FIG. 2, wherein the palm rest is shown in two different rotational positions.
Figure 4:
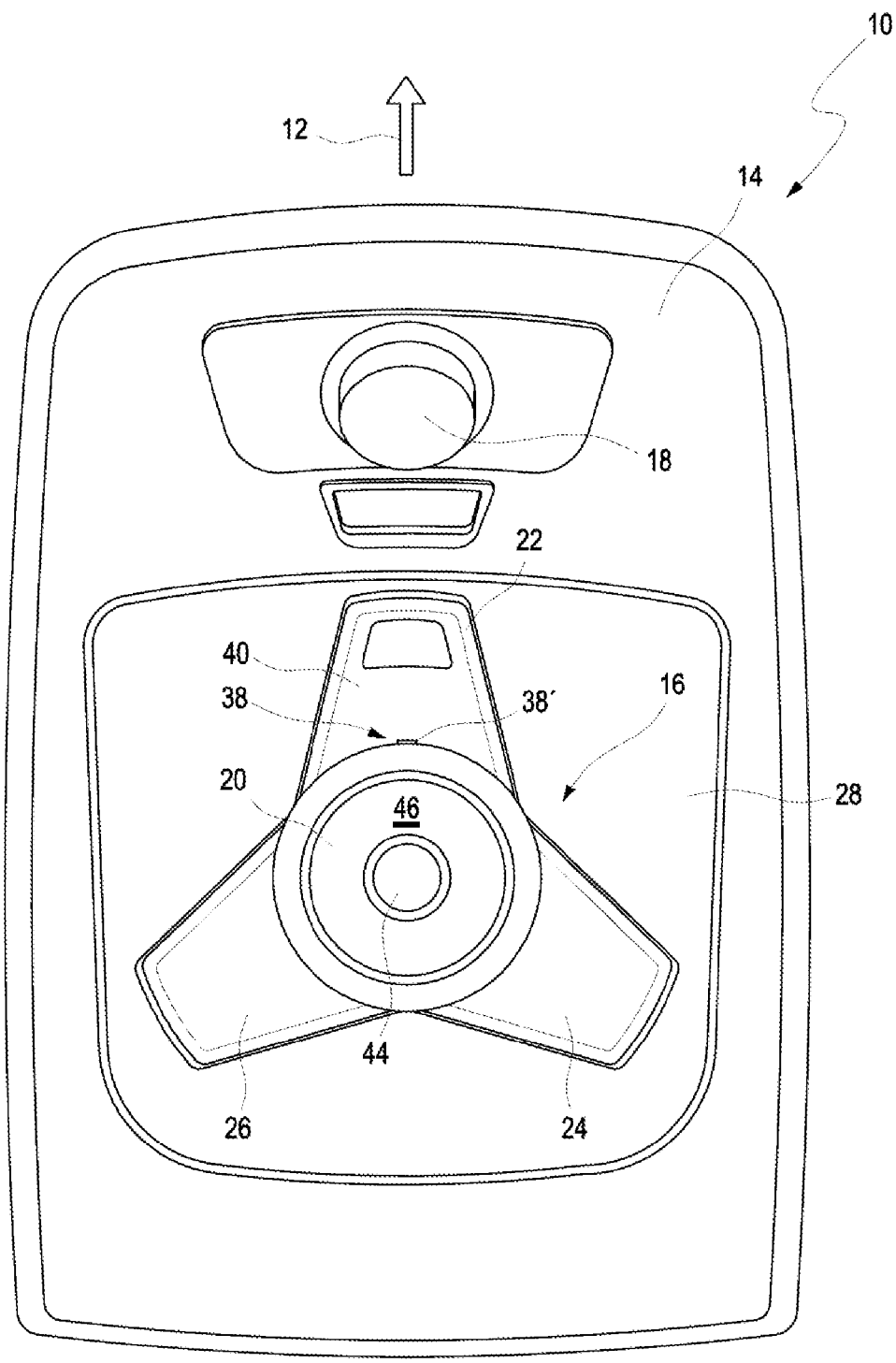
FIG. 4 shows a schematic illustration of a plan view of the center console of FIG. 1.

Reference will now be made in detail to the preferred embodiments of the present invention, examples of which are illustrated in the accompanying drawings, wherein like reference numerals refer to like elements throughout.

FIG. 1 to FIG. 4 show a center console 10 of a motor vehicle (not widely illustrated). The motor vehicle can be, for example, a passenger car which is driven electrically or by means of an internal combustion engine. The center console 10 is located next to the driver's seat when viewed in the forward travel direction 12 of the motor vehicle. In the center console 10, a recess 14 is formed in which a support element 16 is arranged. The support element 16 forms a palm rest 16 for a driver of the motor vehicle when the driver is sitting in the driver's seat. In front of the palm rest 16 in the direction of travel 12 there can be an operator control device 18 of an Infotainment system, for which the driver can easily perform operator control when he has placed his hand on the palm rest 16. The palm rest 16 has a base body 20 in the form of a truncated cone from which three wing elements 22, 24, 26 protrude parallel to a casing or a housing 28 of the center console 10. The housing 28 constitutes an interior trim of the motor vehicle. Overall, the palm rest 16 has a starshaped basic shape as a result of the wing element 22, 24, 26. The truncated cone shape of the base body 20 results from a side wall 30 of the base body 20 which is inclined toward the housing 28.

The palm rest 16 is a component of an operator control device of a driver assistance device of the motor vehicle, by means of which operator control device the motor vehicle can be driven, during travel, in a partially automatic, fully automatic and autonomous assistance mode. In the partially automatic assistance mode, a cruise control and an adaptive cruise control (ACC—automatic cruising control) can be made available by the driver assistance device. In the fully automatic assistance mode, lateral guidance of the motor vehicle can additionally also be carried out by means of the driver assistance device, for example in a traffic jam or during a parking maneuver by means of the driver assistance device. The driving maneuvers which the driver assistance device is to carry out in this context are predefined to the driver assistance system by the driver via a user interface which also comprises the palm rest 16. Furthermore, in an autonomous assistance mode the driver assistance device is able to decide independently what speed or what distance from a vehicle traveling ahead is to be set and at what distance from the hard shoulder the motor vehicle is to be driven.

For manual driving, i.e. when the driver assistance device is deactivated (also referred to here as manual assistance mode), the established operator control elements of the motor vehicle, i.e. the steering wheel and the pedals, are subject to operator control by the driver in the known fashion. The palm rest 16 serves here exclusively as a palm rest when operator control of the Infotainment system 18 is being performed.

The operator control device for the driver assistance device also includes a resume key 32 and a set key 34 which are installed in the housing 28. The resume key 32 is located relatively close to the front of the motor vehicle in the direction 12 of travel. The set key 34 is located to the left next to the palm rest 16 in the direction of travel 12, on a side of the palm rest 16 facing the driver's seat. With a hand resting on the palm rest 16 the driver can therefore activate the resume key 32 with his middle finger and the set key 34 with his thumb without fumbling around. A changeover between a stand-by operating mode and an active operating mode of the driver assistance device in the partially automatic assistance mode can be made possible by means of the resume key 32. For example the current speed can be accepted as a set point speed for the cruise control by means of the set key 34.

The palm rest 16 is mounted so as to be rotatable about a vertical axis 36. In the position shown in FIG. 1 the driver assistance system is in a manual assistance mode, i.e. the driver assistance system is deactivated and the driver of the motor vehicle assumes all the driving tasks himself during the driving of the motor vehicle.

The partially automatic assistance mode of the driver assistance device can be activated by pressing the resume key 32. As a result, a keypad 38 is activated which can then be easily reached both with the thumb and with the index finger of the hand resting on the palm rest 16. The keypad 38 comprises an operator control element 38' for setting the speed in the partially automatic assistance mode. The operator control element 38' can be, for example, a rotary wheel, a monostable rocker or a rocker key. The keypad 38 can have further keys (not illustrated) for partial automation setting possibilities. In addition, the resume key 32 and the set key 34 are activated during partial automation. Finally, a monostable adjustment possibility of the palm rest 16 in the direction of travel 12 for setting the distance for the automatic adaptive cruise control is also possible.

Furthermore, a touchscreen 40 (touch-sensitive screen) can be installed on the wing element 22. In the partially automatic assistance mode of the driver assistance device, a display on the touchscreen 40 indicates to the driver which keys of the operator control pad 38 are linked to which function of the driver assistance device (for example "speed" for the operator control element 38'). Furthermore, a symbol (A+) on the touchscreen 40 indicates to the driver that he can increase the degree of automation, i.e. the degree of independence of the driver assistance device during the driving of the motor vehicle, by rotating the palm rest 16 about the vertical axis 38 in a rotational direction 42.

By manually rotating the palm rest 16 through 60° in the rotational direction 42, a fully automatic assistance mode is correspondingly activated. The keys 32, 34 in the housing 28 of the center console 10 remain in their position here. After the rotation, the wing elements 22, 26 therefore cover the keys 32, 34. One of the covered key elements, the resume key 32, is located here underneath the touchscreen 40 on which a simulation 32' of the resume key 32 is displayed in the fully automatic assistance mode. This region of the simulation 32' on the touchscreen 40 is assigned here to another function which is made available during full automation. As a result of the rotation, the keypad 38 is furthermore no longer in the direct reach of the driver. The driver can also no longer see from his sitting position in the driver's seat the keys of the keypad 38, in particular the key 38' for the cruise control, since the inclined side wall 30 screens the keys from the driver's view. As a consequence, for full automation there remains an actively implemented palm rest 16 which can move perpendicularly in the x-y plane with respect to the vertical axis 36 and has merely one sensor key 44 on a resting surface 46 for the driver's hand. The palm rest 16 can continue to be used as such here. The sensor key 44 has a smaller area than the entire support face 46, with the result that by broadly resting the hand on the entire support face 46 the sensor key 44 cannot be triggered inadvertently. In this context, the entire support face 46 can be configured as a capacitive key element in which the area of the sensor key 44 can be evaluated separately. If the driver then presses exclusively on the sensor key 44 with a finger, this can be detected by comparison of the sensitive area of the entire support face 46 and the sensitive area of the sensor key 44.

In the fully automatic assistance mode, the palm rest 16 serves as a parameter interface and maneuver interface for full automation. In order to set a value of a driving parameter of the driver assistance device (set point distance from a vehicle traveling ahead, set point speed if no vehicle traveling ahead is present, a lateral position of the motor vehicle which is to be set on the lane currently being traveled on) or in order to trigger the driving maneuver (such as for example overtaking, lane change or parking) the palm rest 16 is deflected in a monostable fashion by the driver in the x-y plane. The deflection can be possible as a tilting movement or as a translatory movement in the x-y plane. The parameter and maneuver interface can be, for example, that user interface which was filed as a patent by the applicant on the same date as the present patent application.

In respect of the operator control of the parameter maneuver interface in the fully automatic assistance mode it is also possible to provide for the driver's hand on the palm rest 16 to be opposed by a force which is generated by an actuator in the center console 10. As a result, by means of a force/travel characteristic curve and by deflecting the palm rest 16 it is possible to signal to the driver where particularly favorable or unfavorable values for the driving parameters to be set are produced. It is therefore possible to signal to the driver, for example, that he is about to set an excessively short distance from the vehicle traveling ahead. This can be communicated by making it more difficult for the driver to deflect the palm rest 16 still further in the direction 12 of travel by means of the driver assistance device using the actuator. Force sinks in the force/travel profile permit haptic indication of a favorable value.

In the housing 28 it is possible to form a depression 48 into which the wing elements 22, 24, 26 of the palm rest 16 click when the latter has been rotated into the rotational position for the fully automatic assistance mode.

In the fully automatic assistance mode a symbol (A–) is displayed on the touchscreen 40, said symbol indicating to the driver the rotational direction in which he must rotate the palm rest 16 in order to reduce the degree of automation, i.e. to switch back again from the fully automatic assistance mode into the partially automatic assistance mode.

In the fully automatic assistance mode the touchscreen 40 is additionally activated as a touch-sensitive operator control device. Functions can be combined on the touchscreen 40, for example a resume function, a starting carrier and a potential carrier. By means of a starting carrier it is possible to ensure that after automatic stopping of the motor vehicle by the driver assistance device the driver is prepared if the motor vehicle is started again automatically. The functionality of a potential trigger is described in DE 10 2010 022 433 A1 which has already been mentioned.

By means of the sensor key 44 in the support face 46 or by pressure on the entire palm rest 16 an automatic assistance mode is activated when available. This assistance mode is available only if the driver assistance device detects that it can place the motor vehicle in a safe state, for example bring it to a standstill, independently at any time. At the changeover into the autonomous assistance mode, the palm rest 16, together with the keys 32, 34 in the housing 28 of the center console 10, is lowered by virtue of an actuator or by virtue of the pressure applied by the driver on the palm rest 16. The palm rest 16 can either be lowered flush here, with the result that the support face 46 terminates flush with the housing 28, or to such a degree that it can subsequently continue to be used as a palm rest.

The autonomous assistance mode is deactivated by means of the sensor key 44. The deactivation can also be made possible by renewed pressing on the entire support face 46. In the case of deactivation, the palm rest 16 is unlocked by the actuator or by a push-push locking means. The palm rest 16 subsequently moves automatically out of the housing 28 and into a fallback position, for example into the stand-by operating mode of partial automation.

The differentiation of the degree of automation (manual, partially automatic, fully automatic and autonomous assistance mode) is communicated visually, for example by means of the combination instrument behind a steering wheel of the motor vehicle. A further possibility is a feedback LED which can be installed in the palm rest 16 or in the housing 28.

Figure 5:
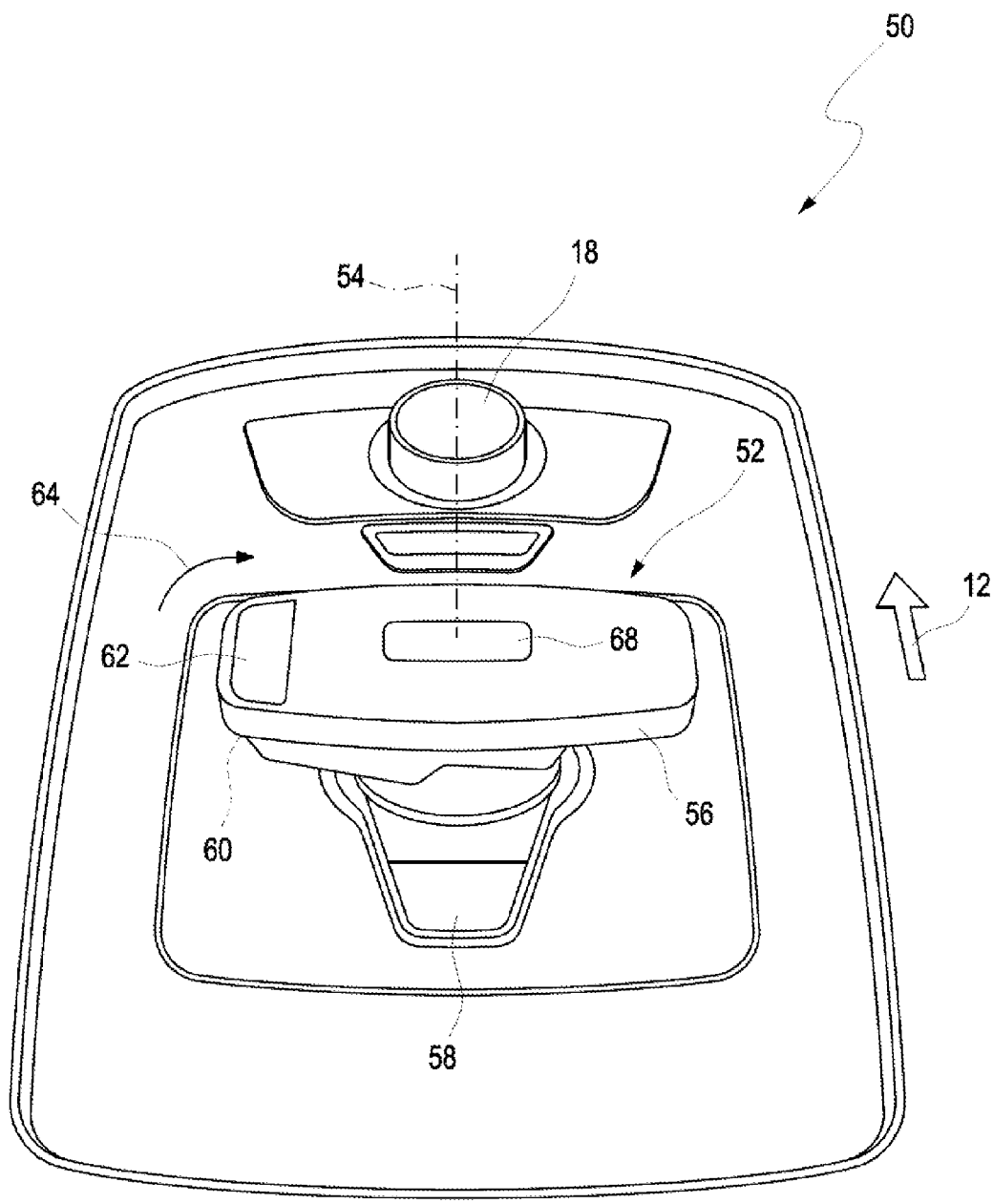
FIG. 5 shows a schematic illustration of a center console of a further embodiment of the motor vehicle according to the invention in a perspective view.
Figure 6:
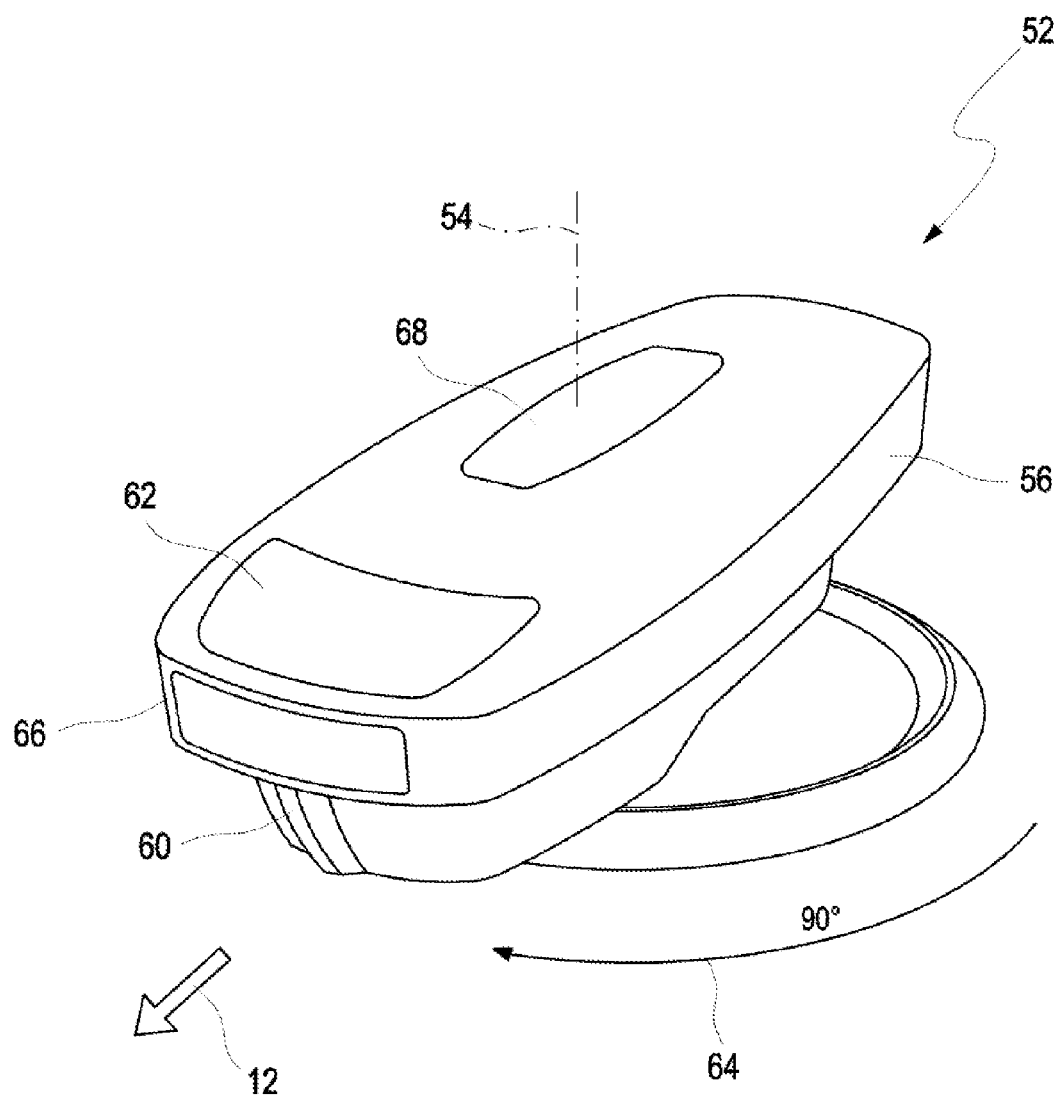
FIG. 6 shows a schematic illustration of a palm rest of the center console of FIG. 5 in a perspective view.

FIG. 5 and FIG. 6 show a center console 50 into which a palm rest 52 is installed. The palm rest 52 is a component of an operator control device for a driver assistance device of the motor vehicle in which the center console 50 is located. The driver assistance device has a manual, a partially automatic, a fully automatic and an autonomous assistance mode, as has already been described in relation to the preceding example. The palm rest 52 is mounted so as to be rotatable about a vertical axis 54. In the position shown in FIG. 5, a bar-shaped base body 56 of the palm rest 52 is oriented with its longitudinal axis perpendicular to a forward direction 12 of travel. In this position, the driver assistance device is in the manual assistance mode. By pressing a resume key which is located in front of the palm rest 52 in the direction 12 of travel and which cannot be seen in FIG. 5, the partially automatic assistance mode can be activated. In this assistance mode, a driver can set driving parameters of a cruise control and/or an adaptive cruise control by activating a set key 58, a rocker switch or rotary switch 60 and the resume key. The switch 60 can be reached here easily with the thumb of a hand resting on the palm rest 52. With the hand it is also possible to easily perform operator control of an operator control device 18 for an Infotainment system from the palm rest 52. A touchscreen 62 indicates to the driver that he can increase the degree of automation, i.e. can activate a fully automatic assistance mode, by rotating the palm rest 52 through 90° in a rotational direction 64. The position which is assumed as a result by the palm rest 52 after the rotation is shown in FIG. 6. The resume key and the set key 58 are then covered by the palm rest 52 and can therefore no longer be reached by the driver. An inclined side wall 66 additionally makes it difficult for the driver to reach the switch 60, with the result that the probability of the driver unintentionally attempting to perform operator control of said switch 60 is very low when the driver assistance device is being operated in the fully automatic assistance mode. Instead, the touchscreen 62 is offered to the driver as a further operator control element which he can easily touch with his index finger or middle finger in the assumed rotational position. In the automatic assistance mode, corresponding touch faces, which can implement a resume function, a starting trigger and a potential trigger, are displayed on the touchscreen 62 by the driver assistance system.

In the partially automatic assistance mode, the palm rest 52 can be deflected in a monostable fashion in the direction 12 of travel. By means of deflection, the driver can set here a set point distance from a vehicle traveling ahead. In the fully automatic assistance mode, the palm rest 52 can be deflected in an x-y plane perpendicular to the vertical axis 54. As a result, the driver can set further driving parameters of the driver assistance device. By actuating a sensor key 68, the driver can activate the autonomous assistance mode and then deactivate it again when necessary.

The operator control possibilities for the described examples, which are made available to the driver by means of the palm rest 16 or 52 and the keys arranged in the region of the palm rest, as a function of the different assistance modes, are summarized once more in the following table.

| Manual driving | | |
|---|---|---|
| Function | Operator control | Explanation |
| Changeover into partial automation | Key 32 | |

| Partial automation | | |
|---|---|---|
| Function | Operator control | Explanation |
| On/off | Key 32 (press for a long time) | |
| Set | Key 32 (press for a short time) | |
| Cruise control | Operator control element 38', 60 | |
| Adaptive cruise control | Briefly deflect support 16, 52 in the direction 12 of travel | |
| Resume | Key 34 (press for a short time) | |
| Starting trigger | Key 34 (press for a short time) | |
| Boost | Key 34 (press for a long time) | |
| Changeover into full automation | Rotation through 60 or 90 | |

| Full automation | | |
|---|---|---|
| Function | Operator control | Explanation |
| Starting trigger Potential trigger | Key 32 | |

| | -continued | |
|---|---|---|
| Maneuver interface | Operator control element processing | |
| ON/OFF changeover into autonomy | Key 44, 68 | Display of availability of AUTO via combination instrument/head-up display may then only be activated on the back of the palm rest |

| Autonomy | | |
|---|---|---|
| Deactivation ON/OFF | Key 44, 68 (in the case of activation by finger) | Key on the back of the palm rest |

The different arrangements and movement possibilities and the indicator effect of the palm rest as a function of the automatic modes permit highly system-specific display and operator control capability of the respective assistance modes. This increases the system transparency and simplifies the possibility of learning the automation spectrum. As a result of the individual keypads being covered (by the protruding part and the rotational position of the palm rest), the complexity of the operator control element and the activation possibility decreases suddenly in the direction of full automation.

In addition, active feedback of the operator control element in the fully automatic mode by means of force feedback, even when operator control of the Infotainment system is being performed, provides the possibility of communicating the state of the control system comprising the vehicle to the driver.

The star-shaped configuration of the palm rest 16 provides the advantage that operator control of the two keys 33, 34 in the housing 28 can, on the one hand, be performed without fumbling around if they are not covered by the wing elements 22, 26, and on the other hand, that they are covered as a result of rotation of the palm rest 16. As a result, in the partially automatic assistance mode two additional keys 32, 34 can therefore be made available, which then do not need to be installed on the palm rest 16 and where they then also need to be brought out of the driver's reach in the fully automatic assistance mode. Correspondingly, only the operator control element 38 for cruise control, and not necessarily a further key element, has to be integrated in the star shape of the palm rest 16. The touch screen 40 also does not have to have a further key function in the fully automatic assistance mode.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A motor vehicle, comprising:
   a driver assistance device configured to be operable in a plurality of assistance modes which differ from one another in a degree of independence in controlling driving operations of the motor vehicle during driving of the motor vehicle; and
   an operator control device configured to set a currently active assistance mode for the driver assistance device, the operator control device being arranged to serve as a palm rest and arranged for a hand surface of a user of the operator control device, the operator control device comprising:

a support body mounted so as to be manually rotatable about a vertical axis, the driver assistance device being switched over between the plurality of assistance modes, to set the currently active assistance mode, as a function of a rotational position of the support body;

a plurality of operator control elements selectively arranged in a primary reach of a driver of the motor vehicle to set, when activated, driving parameters for respective assistance modes, each driving parameter defining a driving behavior of the driver assistance device in the respective assistance mode, the operator control elements comprising a wing operator control element and a lower operator control element, the lower operator control element being arranged next to the support body; and a wing element extending from the support body and which covers, as a function of the rotational position of the support body the lower operator control element, the wing operator control element being arranged on the wing element such that the wing operator control element is located above the lower operator control element when the wing element covers the lower operator control element.

2. The motor vehicle as claimed in claim 1, wherein
the plurality of operator control elements further comprise a rocker switch arranged on an outer circumference of the support body,
the rocker switch is formed in a plane parallel to the vertical axis about which the support body rotates, and
the rocker switch has a relative position with respect to a driver's seat of the motor vehicle, which is dependent on the rotational position of the support body.

3. The motor vehicle as claimed in claim 1, wherein
the operator control device is mounted in an interior trim of the motor vehicle,
the support body is mounted in such a way that it can be lowered into the interior trim and moved out again,
the driver of the motor vehicle triggers the lowering and the moving out by pressing on the support body, and
the currently active assistance mode is changed in each case together with the lowering and the moving out.

4. The motor vehicle as claimed in claim 3, wherein
when the support body is lowered, the support body is held in a lowered position by an actuator or a push-push locking device.

5. The motor vehicle as claimed in claim 1, wherein
in at least one rotational position, the support body is mounted so as to be deflectable transversely with respect to the vertical axis about which the support body rotates,
the support body is deflectable transversely with a rotational deflection and/or a translational deflection, and
when the support body is deflected transversely, the support body operates as a control lever for performing operator control of the driver assistance device.

6. The motor vehicle as claimed in claim 1, wherein
in at least one rotational position, the support body is mounted so as to be deflectable transversely with respect to the vertical axis about which the support body rotates, and
the operator control device has an actuator to set a force/travel characteristic curve for movement of the support body.

7. The motor vehicle as claimed in claim 1, wherein
in at least one rotational position, the support body is mounted so as to be deflectable transversely with respect to the vertical axis about which the support body rotates, and
the operator control device has an actuator to generate a force feedback at the support body, for the driver of the motor vehicle.

8. The motor vehicle as claimed in claim 1, wherein
the plurality of assistance modes comprise a partially automatic assistance mode, to drive the motor vehicle in a partially automated fashion based on driving parameters set by the driver of the motor vehicle using the operator control device, and
in the partially automatic assistance mode, a corresponding mechanical or electro-mechanical coupling is maintained allowing the driver of the motor vehicle to intervene directly in driving of the motor vehicle, using a steering handle and/or a pedal.

9. The motor vehicle as claimed in claim 1, wherein
the plurality of assistance modes comprise a fully automatic assistance mode, to drive the motor vehicle in a completely automated fashion with independent longitudinal and lateral guidance, and
in the fully automatic assistance mode, the driver of the motor vehicle selects, via the operator control device, a future driving maneuver which is to be carried out by the driver assistance device, and/or driving parameters of a current driving maneuver which is currently being carried out.

10. The motor vehicle as claimed in claim 1, wherein
the plurality of assistance modes comprise an autonomous assistance mode, to drive the motor vehicle autonomously, and
in the autonomous assistance mode, the driver assistance device defines independently a driving parameter of a current driving maneuver which is currently being carried out.

11. The motor vehicle as claimed in claim 1, wherein
the plurality of assistance modes comprise:
a manual assistance mode in which the driver assistance device provides no assistance in driving of the motor vehicle;
a partially automatic assistance mode in which at least cruise control is provided;
a fully automatic assistance mode in which independent longitudinal and lateral guidance, parameterized by the driver of the motor vehicle, is provided; and
an autonomous assistance mode in which the driver assistance device completely independently drives the motor vehicle, and
the driver assistance device successively changes between the assistance modes as follows:
the driver assistance device changes from the manual assistance mode to the partially automatic assistance mode if the driver moves the support body out of an interior trim;
the driver assistance device changes from the partially automatic assistance mode to the fully automatic assistance mode if the driver rotates the support body through a predetermined angle about its vertical axis; and
the driver assistance device changes from the fully automatic assistance mode to the autonomous assistance mode if the driver of the motor vehicle lowers the support body into the interior trim.

12. The motor vehicle as claimed in claim 1, wherein the lower operator control element is arranged in a same plane as an interior trim of the motor vehicle.

13. The motor vehicle as claimed in claim 1, wherein the operator control device is provided in a center console of the motor vehicle.

14. The motor vehicle as claimed in claim 1, wherein the wing operator control element is configured as touchscreen.

15. The motor vehicle as claimed in claim 1, wherein when the wing operator control element is above the lower operator control element, the touchscreen simulates the lower operator control element.

16. The motor vehicle as claimed in claim 1, wherein a plurality of wing elements extend from the support body.

17. A method for operating a motor vehicle, the motor vehicle comprising:
- a driver assistance device configured to be operable in a plurality of assistance modes which differ from one another in a degree of independence in controlling driving operations of the motor vehicle during driving of the motor vehicle; and
- an operator control device is mounted in an interior trim of the motor vehicle, the operator control device being configured to set a currently active assistance mode for the driver assistance device, the operator control device being arranged to serve as a palm rest and arranged for a hand surface of a user of the operator control device, the operator control device comprising:
  - a support body mounted so as to be manually rotatable about a vertical axis and lowerable in the interior trim, the driver assistance device being switched over between the plurality of assistance modes, to set the currently active assistance mode, as a function of a rotational position of the support body or a vertical position of the support body with respect to the interior trim;
  - a plurality of operator control elements selectively arranged in a primary reach of a driver of the motor vehicle to set, when activated, driving parameters for respective assistance modes, each driving parameter defining a driving behavior of the driver assistance device in the respective assistance mode, the operator control elements comprising a wing operator control element and a lower operator control element, the lower operator control element being arranged next to the support body; and
  - a wing element extending from the support body and which covers, as a function of the rotational position of the support body the lower operator control element, the wing operator control element being arranged on the wing element such that the wing operator control element is located above the lower operator control element when the wing element covers the lower operator control element, wherein the method comprises:
lowering the support body, by the driver the motor vehicle, the support body being lowered into the interior trim to change the vertical position of the support body with respect to the interior trim;
during travel of the motor vehicle, detecting a change in the rotational position or the vertical position of the support body, the change in the rotational position or the vertical position being detected by the driver assistance device;
setting the currently active assistance mode of the driver assistance device as a function of the change in the rotational position or the vertical position that was detected; and
activating or deactivating a functionality provided by the wing operator control element as a function of the currently active assistance mode.

* * * * *